(12) United States Patent
Lee

(10) Patent No.: US 11,204,101 B2
(45) Date of Patent: Dec. 21, 2021

(54) VALVE HAVING STREAMLINED FLUID FLOW SPACE

(71) Applicant: Sang Seon Lee, Wonju-si (KR)

(72) Inventor: Sang Seon Lee, Wonju-si (KR)

( * ) Notice: Subject to any disclaimer, the term of this patent is extended or adjusted under 35 U.S.C. 154(b) by 54 days.

(21) Appl. No.: 16/745,121

(22) Filed: Jan. 16, 2020

(65) Prior Publication Data

US 2020/0240532 A1    Jul. 30, 2020

Related U.S. Application Data

(63) Continuation of application No. PCT/KR2019/005453, filed on May 8, 2019.

(30) Foreign Application Priority Data

Jan. 25, 2019  (KR) .................. 10-2019-0010047
May 7, 2019   (KR) .................. 10-2019-0053042

(51) Int. Cl.
*F16K 7/12*   (2006.01)
*F16K 27/02*  (2006.01)

(52) U.S. Cl.
CPC .......... *F16K 7/126* (2013.01); *F16K 7/123* (2013.01); *F16K 27/0236* (2013.01); *F16K 27/0272* (2013.01)

(58) Field of Classification Search
CPC . F16K 7/12; F16K 7/123; F16K 7/126; F16K 7/14; F16K 7/16; F16K 27/0236; F16K 27/0272
See application file for complete search history.

(56) References Cited

U.S. PATENT DOCUMENTS 5,489,124 A * 2/1996 Nee .................. F16L 23/167
                                              285/14
2002/0158222 A1* 10/2002 Johnson ............... F16K 7/126
                                              251/291

FOREIGN PATENT DOCUMENTS

| CN | 105587915 A | * | 5/2016 |
|----|-------------|---|--------|
| GN | 105587915 A |   | 5/2016 |
| JP | 2004-245270 A |   | 9/2004 |
| JP | 2009121547 A |   | 6/2009 |
| KR | 20170035589 A |   | 3/2017 |
| KR | 20170035819 A |   | 3/2017 |
| KR | 1020170035819 A |   | 3/2017 |
| KR | 20180010068 A |   | 1/2018 |
| KR | 1020180010068 A |   | 1/2018 |

* cited by examiner

*Primary Examiner* — Hailey K. Do

(57) ABSTRACT

A valve having a streamlined fluid flow space is disclosed. The valve includes a main body and an opening-closing member, a fluid flow space through which fluid flows is formed inside the main body, the opening-closing member opens or closes flow of the fluid. Here, the fluid flow space has a streamlined shape from an inlet in a direction from the inlet to the opening-closing member or from an outlet in a direction from the outlet to the opening-closing member.

12 Claims, 5 Drawing Sheets

FIG. 5

| DIMENSION TABLE | | | |
|---|---|---|---|
|  | DN25 | DN40 | DN50 |
| DN | 25 | 40 | 50 |
| L (min.) | 132 | 165 | 187 |
| L (max.) | 160 | 200 | 230 |
| R1 (min.) | 70 ~ 75 | 90 ~ 95 | 95 ~ 100 |
| R1 (max.) | 80 ~ 85 | 105 ~ 110 | 110 ~ 115 |
| R2 (min.) | 95 ~ 100 | 130 ~ 135 | 145 ~ 150 |
| R2 (max.) | 105 ~ 110 | 145 ~ 150 | 160 ~ 165 |
| R3 (min.) | 50 ~ 55 | 65 ~ 70 | 85 ~ 90 |
| R3 (max.) | 60 ~ 65 | 80 ~ 85 | 100 ~ 105 |
| H (min.) | 7 | 8 | 9 |
| H (max.) | 10 | 11 | 12 |

VALVE HAVING STREAMLINED FLUID FLOW SPACE

CROSS-REFERENCE TO RELATED APPLICATIONS

This application is a continuation application of a PCT application filed on May 8, 2019 and assigned Serial No. PCT/KR2019/005453, and which claims priority from Korean Patent Application No. 10-2019-0010047 filed with the Korean Intellectual Property Office on Jan. 25, 2019, Korean Patent Application No. 10-2019-0053042 filed with the Korean Intellectual Property Office on May 7, 2019. The entire disclosure of above patent applications is incorporated herein by reference.

TECHNICAL FIELD

The present disclosure relates to a valve having a streamlined fluid flow space.

BACKGROUND ART

A valve opens/closes flow of fluid, and controls the flow of fluid using a diaphragm.

FIG. 1 is a view illustrating structure of conventional valve.

In FIG. 1, the valve includes a main body 100, a diaphragm 102 and a manipulation member 104 for controlling the diaphragm 102.

A fluid flow space is formed in the main body 100, and fluid inputted into an inlet 110 of the fluid flow space 106 is outputted through an outlet 112.

Referring to the fluid flow space 106, parts adjacent to the diaphragm 102 of an inner upper surface of the main body 100a have respectively rectangular cross section, and a part 100c contacted with the diaphragm 102 of an inner lower surface 100b of the main body 100 has an angled shape.

A vortex may be occurred to an A part of the fluid flow space 106 due to a part of the main body 100 having the rectangular cross section and the part 100c of the main body 100 having the angled shape. Fluid flow is hindered by the part having the rectangular cross section and the part 100c having the angled shape and thus fluid energy or fluid velocity is changed in view of fluid mechanics to generate the vortex.

This vortex gives rise to damage the main body 100 and the diaphragm 102, and so lifetime of the valve is reduced.

The fluid flow space 106 has a straight line from the inlet 110 or the outlet 112 to near the center part and is vertically formed toward the center part from an end of the straight line, and thus a vertical part operates as an obstacle for hindering the fluid flow. Accordingly, fluid transfer amount per hour becomes smaller.

SUMMARY

To solve problem of the conventional technology, the disclosure is to provide a valve including a streamlined fluid flow space.

A valve according to an embodiment of the disclosure includes a main body; and an opening-closing member. Here, a fluid flow space through which fluid flows is formed inside the main body, the opening-closing member opens or closes flow of the fluid, and the fluid flow space has a streamlined shape from an inlet in a direction from the inlet to the opening-closing member or from an outlet in a direction from the outlet to the opening-closing member.

A valve according to an embodiment of the disclosure includes a main body; and an opening-closing member. Here, a fluid flow space through which fluid flow is formed inside the main body, the opening-closing member opens/closes flow of the fluid, an inner upper surface of the valve corresponding to the fluid flow space has a streamlined shape from an inlet in a direction from the inlet to the opening-closing member, and a ratio R1/L of a radius R1 of a curve of the inner upper surface and a distance L between the inlet and an outlet is more than 170/480.

In a valve of the disclosure, a fluid flow space has a streamlined shape, specially has the streamlined shape from an inlet or an outlet in a direction to an opening-closing member from the inlet or the outlet, and thus fluid flows smoothly. As a result, fluid transfer amount per hour may be considerably increased.

The valve of the disclosure includes a metal member in a main body formed of plastic, and so distortion may not be occurred to the valve when the valve is combined with a pipe.

BRIEF DESCRIPTION OF DRAWINGS

Example embodiments of the present disclosure will become more apparent by describing in detail example embodiments of the present disclosure with reference to the accompanying drawings, in which:

FIG. 5 is a view illustrating a table showing ratio of curves in FIG. 4;

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

A valve of the disclosure includes a fluid flow space having a streamlined shape in a direction to an opening-closing member from an inlet or an outlet.

In conventional valve, since a fluid flow space has a straight line in a direction to a central part from an inlet or an outlet and both sides of the central part have vertically formed, fluid is not smoothly flowed through the fluid flow space and fluid flow is hindered by an obstacle such as a vertical part. As a result, fluid transfer amount per hour becomes smaller.

Whereas, since the fluid flow space of the valve of the disclosure has the streamlined shape in a direction from and inlet or an outlet to a central part corresponding to an opening-closing member, an obstacle for hindering flow of the fluid does not exist in the fluid flow space and so the fluid flows smoothly. As a result, fluid transfer amount per hour may be considerably increased. A CV value of the valve of the disclosure may be higher than that of the conventional valve by 70% or more.

Hereinafter, various embodiments of the disclosure will be described in detail with reference to accompanying drawings.

Figure 2:
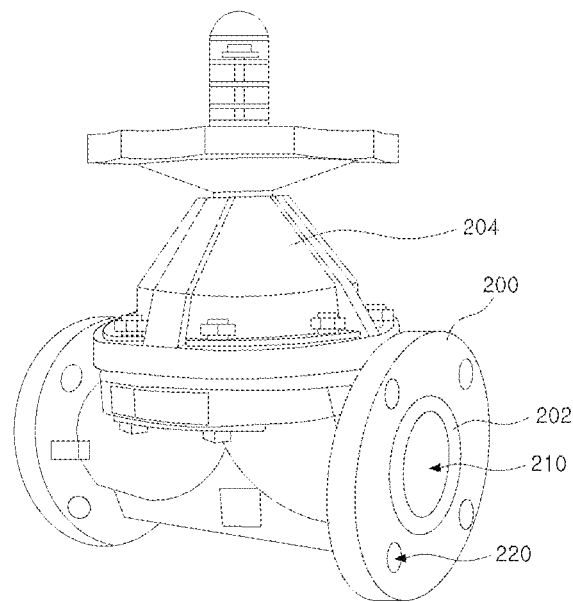
FIG. 2 is a perspective view illustrating a valve according to an embodiment of the disclosure.
Figure 3:
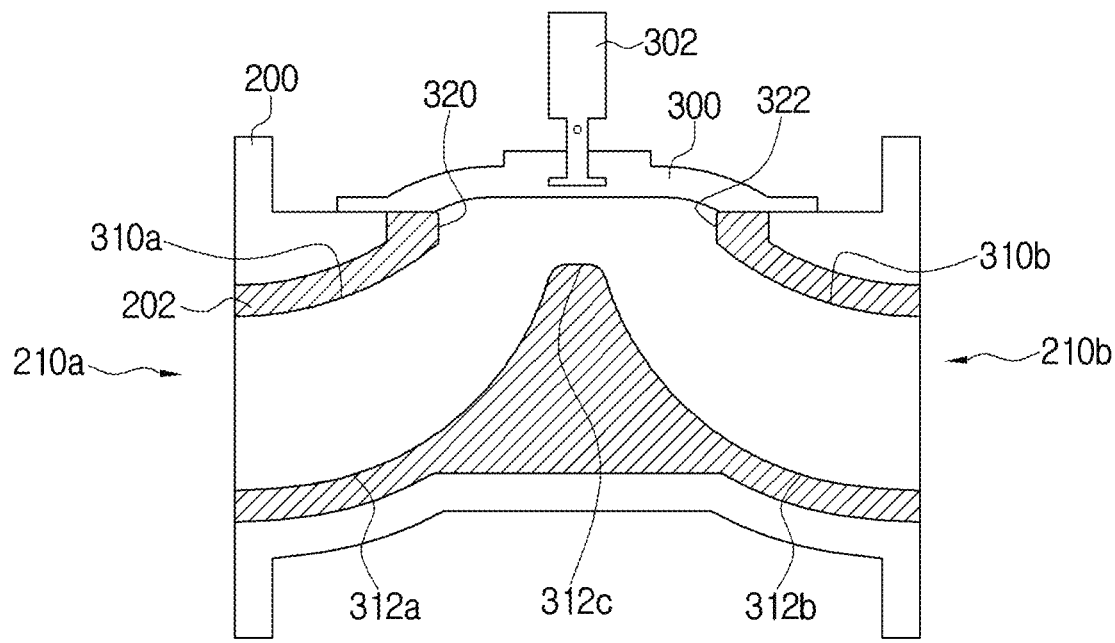
FIG. 3 is a sectional view illustrating schematically the valve in FIG. 2.
Figure 4:
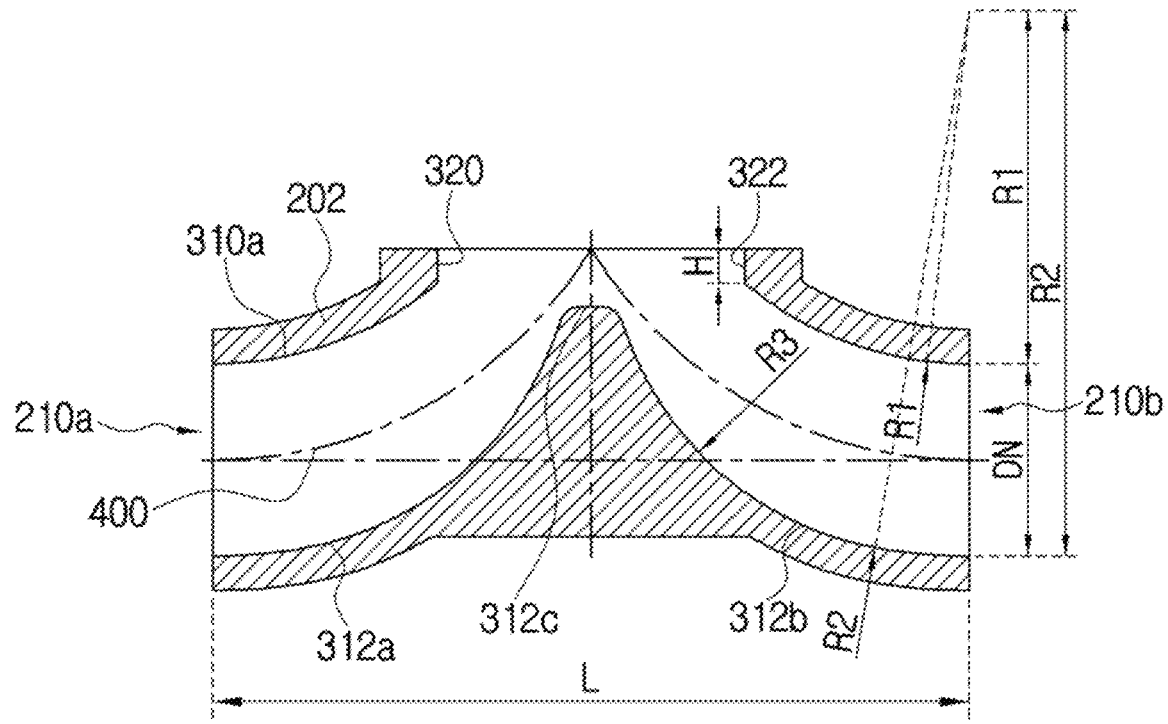
FIG. 4 is a view illustrating a structure of a fluid transfer space according to an embodiment of the disclosure.

FIG. 2 is a perspective view illustrating a valve according to one embodiment of the disclosure, and FIG. 3 is a sectional view illustrating schematically the valve in FIG. 2. FIG. 4 is a view illustrating a structure of a fluid transfer space according to an embodiment of the disclosure, and FIG. 5 is a view illustrating a table showing ratio of curves in FIG. 4. Unit is not written in the table in FIG. 5, but it is mm.

In FIG. 2 and FIG. 3, the valve of the present embodiment is for example a diaphragm valve, and includes a main body 200, a liner 202, a manipulation member 204 and an opening-closing member 300.

The main body 200 is formed of a metal or plastic.

In an embodiment, the main body 200 may be formed of an engineering plastic, for example a polyphenylene ethers resin composition including a polyphenylene ethers resin and a polystyrene resin. Of course, the main body 200 may be formed of a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination, as the engineering plastic.

Holes 220 may be formed on a side end part (flange) of the main body 200, and a fastening member may connect the valve to a pipe through the holes 220.

The liner 202 is disposed inside the main body 200, a hole (fluid flow space) 210 for fluid flow is formed inside the liner 202.

In an embodiment, the liner 202 may be formed of a fluorine resin. The fluorine resin means every resin including fluorine in a molecule, and it includes a Polytetrafluoroethylene, PTFE, a Polychlorotrifluoroethylene PCTFE or a Perfluoroalkoxy alkane PFA, etc. This fluorine resin has excellent heat resistance, excellent chemical resistance, excellent electric insulation, small friction coefficient, and does not have adhesion. That is, friction coefficient of the liner 202 is small when the liner 202 is formed of the fluorine resin, and thus change of velocity of a moving fluid by a laminar flow may be minimized. In other words, difference of velocity of fluid flowing through an upper region or a lower region in the fluid flow space 210 and velocity of fluid flowing through a central region in the fluid flow space 210 may be minimized, based on specific point.

The opening-closing member 300 is a means for opening or closing fluid flow in the fluid flow space 210, and it may locate above the main body 200 or the liner 202.

For example, the opening-closing member 300 may be a diaphragm. On the other hand, the diaphragm is used as the opening-closing member 300, but it is not limited as the diaphragm.

The manipulation member 204 controls an opening/closing operation of the opening-closing member 300, for example may control the opening-closing member 300 so that the opening-closing member 300 contacts with an inner lower surface 312c of the liner 202 or does not contact with the inner lower surface 312c.

In an embodiment, a connection member 302 connected to an upper part of the opening-closing member 300 may be combined with the manipulation member 204, and the opening-closing member 300 may rise or descend in response to movement of the connection member 302 in accordance with control of the manipulation member 204. The manipulation member 204 may be variously modified or adopts conventional structure.

Hereinafter, a structure of the fluid flow space as main feature of the disclosure will be described in detail with reference to accompanying drawings FIG. 3 to FIG. 5.

In FIG. 3 and FIG. 5, the fluid flow space 210 of the present embodiment may have a streamlined shape in a direction from an inlet 210a or an outlet 210b to a central part corresponding to the opening-closing member 300.

Ideally, maximum fluid transfer amount may be achieved when the fluid flow space 210 has the streamlined shape from the inlet 210a to the central part and from the central part to the outlet 210b. However, it is difficult to manufacture the valve if an end part of the liner 202 corresponding to the central part is very sharp, and thus end parts 320 and 322 of the liner 202 corresponding to the central part should be vertically formed. However, the end parts 320 and 322 formed vertically are formed with minimum length H, for example may have a length less than 12 mm.

Specially, the fluid flow space 210 may have the streamlined shape from the inlet 210a or the outlet 210b in a direction from the inlet 210a or the outlet 210b to the central part. That is, a curve starts from the inlet 210a or the outlet 210b.

The fluid flow space in the conventional valve has a straight line from the inlet or the outlet to specific point and is vertically formed from the specific point to a center part, and thus a vertical part operates as an obstacle for hindering the fluid flow. Accordingly, fluid transfer amount per hour becomes smaller.

In the valve of the disclosure, the fluid flow space 210 has the streamlined shape from the inlet 210a or the outlet 210b in a direction from the inlet 210a or the outlet 210b to the central part. Accordingly, an obstacle for preventing fluid flow does not exist in the fluid flow space 210, and so fluid transfer amount per hour is considerably high.

Figure 1:
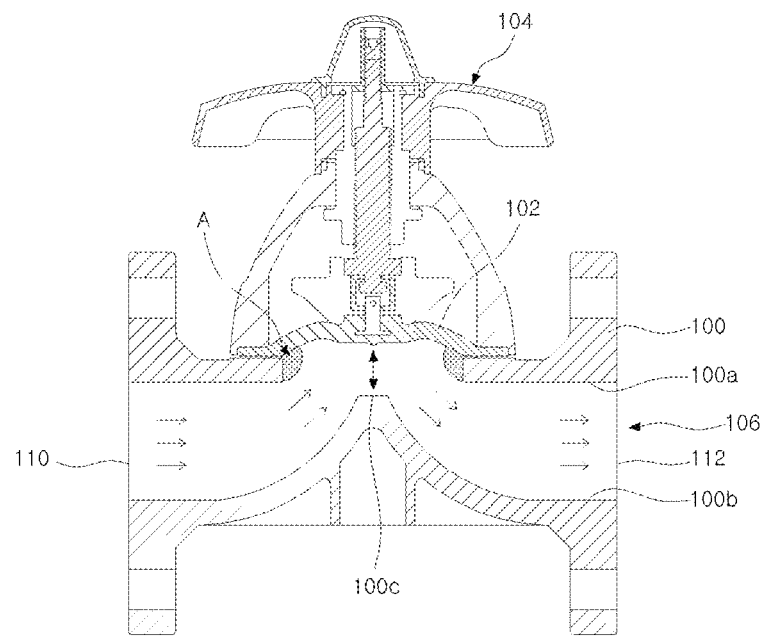
FIG. 1 is a view illustrating structure of conventional valve.

In FIG. 1, flow transfer amount of the conventional valve when the vertical part is modified to a streamlined shape is higher than that of the valve including the vertical part. However, the flow transfer amount per hour of the conventional valve is very smaller than that of the valve of the disclosure which has the streamlined shape from the inlet 210a or the outlet 210b in a direction from the inlet 210a or the outlet 210b to the central part.

That is, since the curve of the fluid flow space 210 starts from the inlet 210a or the outlet 210b in the valve of the disclosure, the fluid transfer amount per hour is very high compared with in the conventional valve. In other words, a CV value of the valve may be considerably enhanced.

In an embodiment, a width of the fluid flow space 210 may become smaller in a direction from the inlet 210a or the outlet 210b to the central part. The opening-closing member 300 rises or descends in a high range in the event that the fluid flow space 210 has the same width in the direction from the inlet 210a or the outlet 210b to the central part, and thus an opening-closing operation is normally performed only when a means for controlling the opening-closing member 300 is rotated by for example maximum seven and a half times. The opening-closing member 300 rises or descends in a relatively small range when the width of the fluid flow space 210 becomes smaller in the direction from the inlet 210a or the outlet 21b to the central part. Accordingly, the opening-closing operation may be smoothly performed though the means for controlling the opening-closing member 300 is rotated by for example four times.

In view of the liner 202 not the fluid flow space 210, a first inner upper surface line 310a, a first inner lower surface line 312a, a second inner upper surface line 310b and a second inner lower surface line 312b may have the streamlined shape.

Both sides of a lower central part 312c of the liner 202 contacted with the opening-closing member 300 may have a curved shape for the purpose of smooth flow of the fluid.

In the valve of the disclosure, a curvature of the fluid flow space 210 may be determined in consideration of fluid flow and a manufacture process. The conventional valve is produced with multiple liners because the fluid flow space has a long-length vertical part. However, the valve of the disclosure may be manufactured with single liner, and the liner is designed with proper curvature ratio for the single liner. As a result, productivity of the conventional valve is deteriorated, but productivity of the valve of the disclosure may be enhanced.

In the fluid flow space 210, a radius of an imaginary center curve 400, a radius of a curve formed by an inner upper surface 310, a radius of a curve formed by an inner lower surface 312, a diameter of the inlet 210a or the outlet 210b of the fluid flow space 210, a height of the vertical part adjacent to the central part and a distance between the inlet 210a and the outlet 210b are respectively defined as R, R1, R2 or R3, DN, H and L. It is assumed that a left space of the fluid flow space 210 is identical to a right space of the fluid flow space 210.

In an embodiment, the inner upper surface 310 may have a curve which has different curvature from the radius R of the center curve 400 of the fluid flow space 210. That is, the curve of the inner upper surface 310 may have the curvature different from the center curve 400 of the fluid flow space 210.

However, if the distance L is more than a predetermined value, the curve of the inner upper surface 310 may include two curves having different curvature to manufacture easily the valve. Here, a curvature of a curve near to the opening-closing member 300 is higher than that of another curve, in the two curves, and curvatures of the two curves may be different from a curvature of the center curve 400. This is for removing easily single core inserted into the fluid flow space 210 when the liner 202 is manufactured.

For example, the inner upper surface 310 may have one curve when the distance L is less than 230 mm, and it may have two curves when the distance L is higher than 230 mm.

Referring to Table in FIG. 5, in the event that the inner upper surface 310 have one curve, a ratio of the radius R1 of the curve of the inner upper surface 310 and the distance L in a DN25 valve may be in the range of 0.44(70/160) to 0.64(85/132), a ratio of the radius R1 of the curve and the distance L in a DN40 valve may be in the range of 0.45(90/200) to 0.67(110/165), and a ratio of the radius R1 of the curve and the distance L in a DN50 valve may be in the range of 0.41(95/230) to 0.58(115/197). In case of a DN150 valve (not shown in Table), the distance L may be in the range of 406 to 480 and the radius R1 may have 170, R1/L may be more than 0.354(170/480).

That is, the ratio of the R1 and the distance L may be in the range of 0.354(170/480) to 0.67(110/165). Here, DN25 means that the diameter of the inlet 210a or the outlet 210b is 25 mm(Φ), DN40 indicates that the diameter of the inlet 210a or the outlet 210b is 40 mm(Φ), and DN50 means that the diameter of the inlet 210a or the outlet 210b is 50 mm(Φ).

A curve of the inner lower surface 312 may include a first curve (radius R2) corresponding to the inlet 210a or the outlet 210b and a second curve (radius R3) near to the opening-closing member 300, i.e. two curves. Here, a curvature of the first curve is different from that of the second curve, and the first curve and the second curve may have different curvature from the center curve 400 (radius R) in the fluid flow space 210. On the other hand, R3 does not exist if the distance L is very great.

A ratio of R2 and the distance L may be in the range of 0.59(95/160) to 0.83(110/132) in the DN25 valve, be in the range of 0.65(130/200) to 0.91(150/165) in the DN40 valve, and be in the range of 0.63(145/230) to 0.84(165/197) in the DN 50 valve. That is, the ratio of R2 and the distance L may be in the range of 0.59(95/160) to 0.91(150/165).

A ratio of R3 and the distance L may be in the range of 0.31(50/160) to 0.49(65/132) in the DN25 valve, be in the range of 0.33(65/200) to 0.52(85/165) in the DN40 valve, and be in the range of 0.37(85/230) to 0.53(105/197) in the DN 50 valve. That is, the ratio of R3 and the distance L may be in the range of 0.31(50/160) to 0.53(105/197).

A ratio of R2 and R3 may be in the range of 1.46(95/65) to 2.2(110/50) in the DN25 valve, be in the range of 1.53(130/85) to 2.31(150/65) in the DN40 valve, and be in the range of 1.38(145/105) to 1.94(165/85) in the DN 50 valve. That is, the ratio of R2 and R3 may be in the range of 1.38(145/105) to 2.2(110/50).

A ratio of R1 and R2 may be in the range of 0.64(70/110) to 0.89(85/95) in the DN25 valve, be in the range of 0.6(90/150) to 0.85(110/130) in the DN40 valve, and be in the range of 0.58(95/165) to 0.79(115/145) in the DN 50 valve. That is, the ratio of R1 and R2 may be in the range of 0.58(95/165) to 0.89(85/95).

A ratio of R1 and R3 may be in the range of 1.08(70/65) to 1.7(85/50) in the DN25 valve, be in the range of 1.06(90/85) to 1.69(110/65) in the DN40 valve, and be in the range of 0.91(95/105) to 1.35(115/85) in the DN 50 valve. That is, the ratio of R1 and R3 may be in the range of 0.91(95/105) to 1.7(85/50).

The height H of the vertical part near to the opening-closing member 300 differs depending on size of the valve, but may be in the range of 7 mm to 12 mm.

On the other hand, the DN25 valve, the DN40 valve and the DN50 valve are mentioned above, but the above ratios may be also applied to different size of valves.

Briefly, in the valve of the disclosure, the fluid flow space 210 may have the streamlined shape in a direction from the inlet 210a or the outlet 210b to the central part corresponding to the opening-closing member 300. Specially, the curve starts from the inlet 210a or the outlet 210b. Accordingly, fluid transfer amount per hour may be enhanced.

In the above, the left space and the right space of the fluid flow space 210 are the same structure and are symmetrically formed, but they may have different structure. Nevertheless, the left space and the right space may have streamlined space, respectively.

Hereinafter, material of the main body 200 formed of plastic will be described in detail.

In an embodiment, the main body 200 may be formed of a super engineering plastic or an engineering plastic. For example, the main body 200 may be made up of a polyphenylene ethers resin composition including a polyphenylene ethers resin and a polystyrene resin. Of course, the main body 200 may be formed of a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

The main body 200 may be formed by mixing a glass fiber with a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the main body 200 may be enhanced. This will be described in detail below.

In another embodiment, the main body 200 may be formed by mixing a glass fiber and a carbon fiber with for example, a PVC, a PP, a PPS, a PPA, a PA6, a PA66, a POK or a PE. Accordingly, strength, impact resistance and mechanical feature of the main body 200 may be enhanced.

In still another embodiment, the main body 200 may be formed by mixing a glass fiber, a carbon fiber and a graphite fiber with for example, a PVC, a PP, a PPS, a PPA, a PA6, a PA66, a POK or a PE. As a result, strength, impact resistance and mechanical feature of the main body 200 may be enhanced.

Hereinafter, an experimental result will be described.

In an embodiment, the main body 200 may be formed by mixing a PP with a glass fiber. Preferably, the glass fiber has a weight percent higher than 0 weight percent and less than 40 weight percent, and the PP has a weight percent higher than 60 weight percent. Experimental result is shown in following table 1.

TABLE 1

| embodiment | glass fiber weight percent | Tensile strength(Mpa@ 23° C.) [ASTM D638] |
|---|---|---|
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the plastic layer 560 when the main body 200 is formed by mixing the PP with the glass fiber is very greater than that of a main body formed of only the PP. That is, mechanical property and chemical property may be enhanced. However, it is difficult to manufacture the main body 200 to have desired shape because an insert molding feature for manufacturing the main body 200 is deteriorated when the glass fiber has a weight percent higher than 40 weight percent.

In an embodiment, the main body 200 may be formed by mixing a PPS with a glass fiber. Preferably, the glass fiber has a weight percent higher than 0 weight percent and less than 40 weight percent, and the PPS has a weight percent higher than 60 weight percent. Experimental result is shown in following table 2.

TABLE 2

| embodiment | glass fiber weight percent | Tensile strength(Mpa@ 23° C.) [ASTM D638] |
|---|---|---|
| comparison | 0 | 70 |
| 1 | 30 | 140 |
| 2 | 40 | 200 |

It is verified through the above table 2 that tensile strength of the main body 200 when the main body 200 is formed by mixing the PPS with the glass fiber is very greater than that of a main body formed of only the PPS. That is, mechanical property and chemical property may be enhanced, and thus light and strong main body 200 may be formed. However, it is difficult to manufacture the main body 200 to have desired shape because an insert molding feature for manufacturing the main body 200 is deteriorated when the glass fiber has a weight percent higher than 40 weight percent.

In still another embodiment, the main body 200 may be formed by mixing a PPA with a glass fiber. Preferably, the glass fiber has a weight percent higher than 0 weight percent and less than 55 weight percent, and the PPA has a weight percent higher than 45 weight percent. Experimental result is shown in following table 3.

TABLE 3

| embodiment | glass fiber weight percent | Tensile strength(Mpa@ 23° C.) [ASTM D638] |
|---|---|---|
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the main body 200 when the main body 200 is formed by mixing the PPA with the glass fiber is very greater than that of a main body formed of only the PPA. That is, mechanical property and chemical property may be enhanced, and thus light and strong main body 200 may be formed. However, it is difficult to manufacture the main body 200 to have desired shape because an insert molding feature for manufacturing the main body 200 is deteriorated when the glass fiber has a weight percent higher than 55 weight percent.

In still another embodiment, the main body 200 may be formed by mixing a PA6 with a glass fiber. Preferably, the glass fiber has a weight percent higher than 0 weight percent and less than 50 weight percent, and the PA6 has a weight percent higher than 50 weight percent. Experimental result is shown in following table 4.

TABLE 4

| embodiment | glass fiber weight percent | Tensile strength(Mpa@ 23° C.) [ASTM D638] |
|---|---|---|
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the main body 200 when the main body 200 is formed by mixing the PA6 with the glass fiber is very greater than that of a main body formed of only the PA6. That is, mechanical property and chemical property may be enhanced, and thus light and strong main body 200 may be formed. However, it is difficult to manufacture the main body 200 to have desired shape because an insert molding feature for manufacturing the main body 200 is deteriorated when the glass fiber has a weight percent higher than 50 weight percent.

In still another embodiment, the main body 200 may be formed by mixing a PA66 with a glass fiber. Preferably, the glass fiber has a weight percent higher than 0 weight percent and less than 50 weight percent, and the PA66 has a weight percent higher than 50 weight percent. Experimental result is shown in following table 5.

TABLE 5

| embodiment | glass fiber weight percent | Tensile strength(Mpa@ 23° C.) [ASTM D638] |
| --- | --- | --- |
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the main body 200 when the main body 200 is formed by mixing the PA66 with the glass fiber is very greater than that of a main body formed of only the PA66. That is, mechanical property and chemical property may be enhanced, and thus light and strong main body 200 may be formed. However, it is difficult to manufacture the main body 200 to have desired shape because an insert molding feature for manufacturing the main body 200 is deteriorated when the glass fiber has a weight percent higher than 50 weight percent.

In still another embodiment, the main body 200 may be formed by mixing a POK with a glass fiber. Preferably, the glass fiber has a weight percent higher than 0 weight percent and less than 40 weight percent, and the POK has a weight percent higher than 60 weight percent. Experimental result is shown in following table 6.

TABLE 6

| embodiment | glass fiber weight percent | Tensile strength(Mpa@ 23° C.) [ASTM D638] |
| --- | --- | --- |
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the main body 200 when the main body 200 is formed by mixing the POK with the glass fiber is very greater than that of a main body formed with only the POK. That is, mechanical property and chemical property may be enhanced, and thus light and strong main body 200 may be formed. However, it is difficult to manufacture the main body 200 to have desired shape because an insert molding feature for manufacturing the main body 200 is deteriorated when the glass fiber has a weight percent higher than 40 weight percent.

Figure 6:
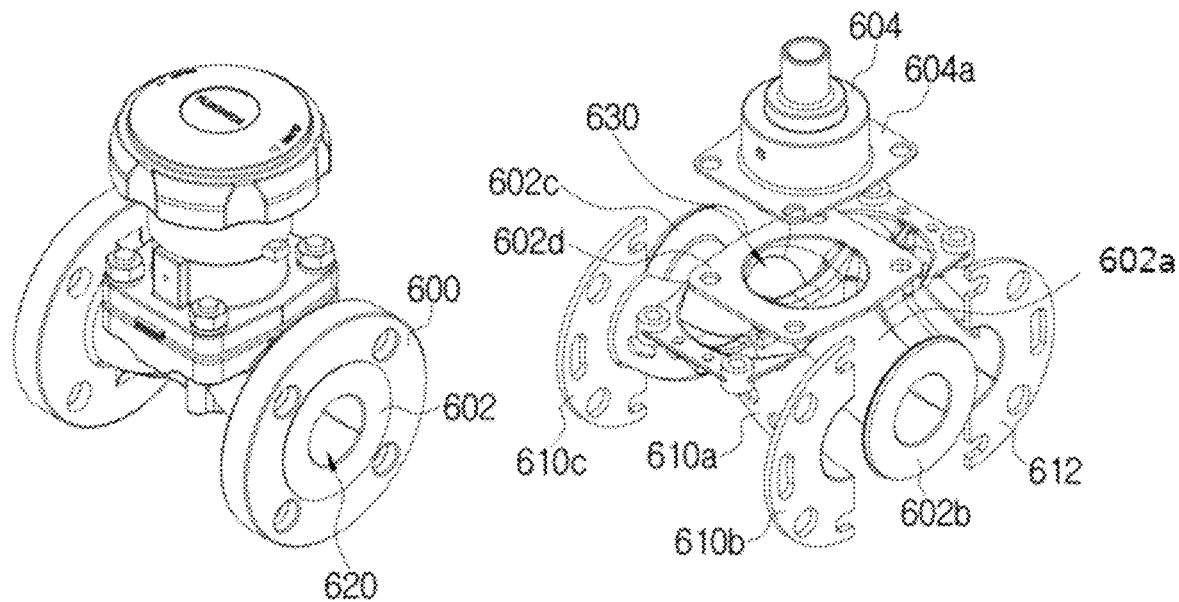
FIG. 6 is a view illustrating a valve according to an embodiment of the disclosure.
Figure 6:
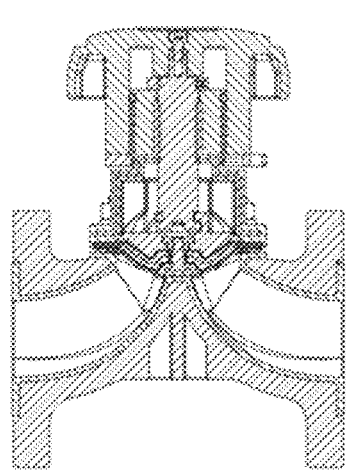
Figure 6:
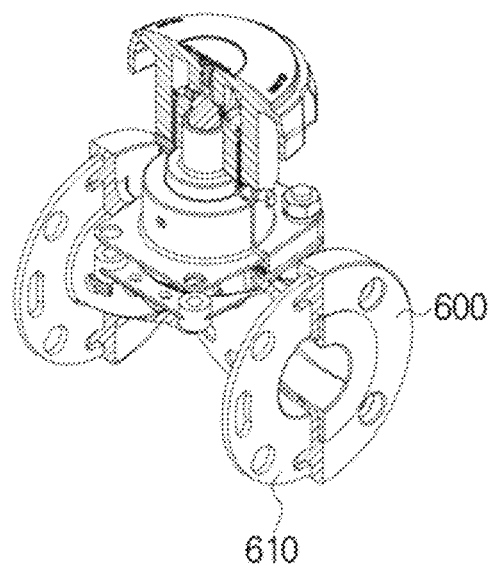

FIG. 6 is a view illustrating a valve according to another embodiment of the disclosure.

In FIG. 6, a valve of the present embodiment may include a main body 600, a liner 602, a metal member having a first sub metal member 610 and a second sub metal member 612 and an opening-closing member 604.

A fluid flow space 620 may be formed in the liner 602, and the fluid flow space 620 may have a streamlined shape in a direction from an inlet to a central part corresponding to the opening-closing member 604 and have a streamlined shape in a direction from the central part to the outlet. A structure of the fluid flow space 620 is the same in FIG. 1 to FIG. 5.

A structure of the main body 600, the liner 602 and the opening-closing member 604 is the same or similar in FIG. 1 to FIG. 5.

The main body 600 may include a main body member and main body flange members formed at both ends of the main body member.

At least one hole may be formed on a first main body flange member, a hole may be formed on a flange of a pipe, and the first main body flange member may be combined with the flange of the pipe by passing a fixing member such as a bolt, etc. through the hole of the first main body flange member and the hole of the flange of the pipe. As a result, the valve may be combined with the pipe.

A hole for combination with the pipe may be formed on a second main body flange member.

The liner 602 may include a line body member 602a, a first liner flange member 602b, a second liner flange member 602c and a line combination member 602d. Here, a space 630 opened/closed by the opening-closing member 604 may be formed at a center of the liner combination member 602d, and the liner combination member 602d may be combined with an opening-closing combination member 604a.

The liner body member 602a may be disposed in the main body member.

The first liner flange member 602b may have higher width than the liner body member 602a and be disposed in the first main body flange member. One side of the first liner flange member 602b may be exposed outside.

The second liner flange member 602c may have higher width than the liner body member 602a and be disposed in the second main body flange member. One side of the second liner flange member 602c may be exposed outside.

The metal member may cover the liner 602 and be included in the main body 600. Here, a whole of the metal member may be covered by the main body 600 and none part of the metal member may be exposed outside. That is, the liner 602 may be disposed in the metal member, and a whole of the metal member may be included in the main body 600.

In an embodiment, the metal member may include a first sub metal member 610 and a second sub metal member 612. For example, the metal member may include two sub metal members 610 and 612 with the same structure. However, the sub metal members 610 and 612 may be separated and may not be combined each other.

The first sub metal member 610 may be in a body, cover a half of the liner 602 and include a first sub body member 610a, a 1-1 sub flange member 610b and a 1-2 sub flange member 610c.

The first sub body member 610a may cover half of the liner body member 602a and have a curve shape.

The 1-1 sub flange member 610b may be connected to an end of the first sub body member 610a and be disposed just beneath of the first liner flange member 602b. Particularly, a groove curve line formed at a center of the 1-1 sub flange member 610b may cover half of the liner body member 602a just beneath of the first liner flange member 602b, wherein the groove curve line may have the same curvature as the liner body member 602a or similar curvature to the liner body member 602a.

In an embodiment, a width of the 1-1 sub flange member 610b is higher than that of the first liner flange member 602b. As a result, at least part of the 1-1 sub flange member 610b may be projected outside the first liner flange member 602b in a width direction while the 1-1 sub flange member 610b supports the first liner flange member 602b, when the 1-1 sub flange member 610b covers the liner body member 602a. Here, the first liner flange member 602b may be projected compared to the 1-1 sub flange member 610b in a longitudinal direction.

On the other hand, the 1-1 sub flange member 610b might cover directly the first liner flange member 602b. In this case, the valve may have unstable structure because a space exists between the liner 602 and the metal member. Accordingly, it is effective that the 1-1 sub flange member 610b covers the liner body member 602a just beneath the first liner flange member 602b.

At least one hole may be formed on the 1-1 sub flange member 610b, a fixing member passing through the hole. That is, the fixing member passes the hole of a first main boy flange member and the hole of the 1-1 sub flange member 610b when the valve is combined with the pipe.

The 1-2 sub flange member 610c may be connected to the other end of the first sub body member 610a and be disposed just beneath of the second liner flange member 602c. Particularly, a groove curve line formed at a center of the 1-2 sub flange member 610c may cover half of the liner body member 602a just beneath of the second liner flange member 602c, wherein the groove curve line may have the same curvature as the liner body member 602a or similar curvature to the liner body member 602a.

In one embodiment, a width of the 1-2 sub flange member 610c is higher than that of the second liner flange member 602c. As a result, at least part of the 1-2 sub flange member 610c may be projected outside the second liner flange member 602c in a width direction while the 1-2 sub flange member 610c supports the second liner flange member 602c, when the 1-2 sub flange member 610c covers the liner body member 602a. Here, the second liner flange member 602c may be projected compared to the 1-2 sub flange member 610c in a longitudinal direction.

On the other hand, the 1-2 sub flange member 610c might cover directly the second liner flange member 602c. In this case, the valve may have unstable structure because a space exists between the liner 602 and the metal member. Accordingly, it is effective that the 1-2 sub flange member 610c covers the liner body member 602a just beneath the second liner flange member 602c.

At least one hole may be formed on the 1-2 sub flange member 610c, a fixing member passing through the hole. That is, the fixing member passes through the hole of a second main boy flange member and the hole of the 1-2 sub flange member 610c when the valve is combined with the pipe.

The second sub metal member 612 may be in a body, cover the other half of the liner 602 and include a second sub body member, a 2-1 sub flange member and a 2-2 sub flange member.

The second sub body member may cover the other half of the liner body member 602a and have a curve shape.

The 2-1 sub flange member may be connected to an end of the second sub body member 610a and be disposed just beneath of the first liner flange member 602b. Particularly, a groove curve line formed at a center of the 2-1 sub flange member may surround the other half of the liner body member 602a just beneath of the first liner flange member 602b, wherein the groove curve line may have the same curvature as the liner body member 602a or similar curvature to the liner body member 602a.

In one embodiment, a width of the 2-1 sub flange member is higher than that of the first liner flange member 602b. As a result, at least part of the 2-1 sub flange member may be projected outside the first liner flange member 602b in a width direction while the 2-1 sub flange member supports the first liner flange member 602b, when the 2-1 sub flange member covers the liner body member 602a. Here, the first liner flange member 602b may be projected compared to the 2-1 sub flange member in a longitudinal direction.

On the other hand, the 2-1 sub flange member might cover directly the first liner flange member 602b. In this case, the valve may have unstable structure because a space exists between the liner 602 and the metal member. Accordingly, it is effective that the 2-1 sub flange member covers the liner body member 602a just beneath the first liner flange member 602b.

At least one hole may be formed on the 2-1 sub flange member, a fixing member passing through the hole. That is, the fixing member passes through the hole of a first main body flange member and the hole of the 2-1 sub flange member when the valve is combined with the pipe.

On the other hand, the 2-1 sub flange member may have a shape of cut doughnuts cut by half, end sections except the groove curve line may be contacted with end sections of the 1-1 sub flange member 610b. That is, the metal member may surround the liner 602 while the end sections of the 1-1 sub flange member 610b are contacted with the end sections of the 2-1 sub flange member. Here, the 1-1 sub flange member 610b has a shape of cut doughnuts cut by half.

The 2-2 sub flange member may be connected to the other end of the second sub body member and be disposed just beneath of the second liner flange member 602c. Particularly, a groove curve line formed at a center of the 2-2 sub flange member may surround the other half of the liner body member 602a just beneath of the second liner flange member 602c, wherein the groove curve line may have the same curvature as the liner body member 602a or similar curvature to the liner body member 602a.

In one embodiment, a width of the 2-2 sub flange member is higher than that of the second liner flange member 602c. As a result, at least part of the 2-2 sub flange member may be projected outside the second liner flange member 602c in a width direction while the 2-2 sub flange member supports the second liner flange member 602c, when the 2-2 sub flange member covers the liner body member 602a. Here, the second liner flange member 602c may be projected compared to the 2-2 sub flange member in a longitudinal direction.

On the other hand, the 2-2 sub flange member might cover directly the second liner flange member 602c. In this case, the valve may have unstable structure because a space exists between the liner 602 and the metal member. Accordingly, it is effective that the 2-2 sub flange member surrounds the liner body member 602a just beneath the second liner flange member 602c.

At least one hole may be formed on the 2-2 sub flange member, a fixing member passing through the hole. That is, the fixing member passes through the hole of a second main body flange member and the hole of the 2-2 sub flange member when the valve is combined with the pipe.

On the other hand, the 2-2 sub flange member may have a shape of cut doughnuts cut by half, end sections except the groove curve line may be contacted with end sections of the 1-2 sub flange member 610c. That is, the metal member may surround the liner 602 while the end sections of the 1-2 sub flange member 610c are contacted with the end sections of the 2-2 sub flange member. Here, the 1-2 sub flange member 610c has a shape of doughnuts cut by half.

In a manufacture process, the metal member may be formed in the main body 600 by using an insert molding. Particularly, the metal member may be included in the main body 600 and the liner 602 may be formed in the metal member by insert-molding a structure where the sub metal members 610 and 612 surround the liner 602 in plastic which is material of the main body 600

At least one hole other than the hole for the fixing member may be formed on the flange members of the metal member, so that the metal member is strongly fixed to the main body 600. In the insert molding process, melt plastic fills the hole, and thus the metal member may be strongly combined in the main body 600.

One or more projection members may be formed on the metal member to more strongly combine the metal member in the main body 600.

To use two separated sub metal members 610 and 612 is for locating the liner 602 in the metal member. It is impossible to insert the liner 602 in the metal member because a width of the flange member 602b or 602c of the liner 602 is greater than an inner space of the metal member, if the metal member is formed in a body. Accordingly, two separated sub metal members 610 and 612 are used to locate the liner 602 including the flange member 602b or 602c higher than the inner space of the metal member in the metal member.

Shortly, the sub metal members 610 and 612 may be included in the main body 600 formed of the plastic through the insert molding, while two sub metal members 610 and 612 surround the liner 602. Here, the liner 602 may locate in the metal member.

Distortion may occur to a valve by a fixing force of a fixing member in a direction opposed to a fixed direction when a flange of the valve is combined with a flange of a pipe through the fixing member, if the main body 600 surrounds directly a liner and a metal member does not surround the liner.

Distortion may not occur or be minimized to the valve because a flange in the valve is strengthened though the flange of the valve is combined with a flange of a pipe through the fixing member, when the metal member is included in the main body 600 formed of the plastic while the liner 602 is disposed in the metal member.

Of course, distortion may be prevented when the valve is combined with the pipe, if the main body 600 is formed of metal and the liner 602 is included in the main body 600. However, it is difficult to process the main body 600 and manufacture cost of the valve may increase sharply.

Accordingly, the main body 600 in the valve of the disclosure is formed of the plastic, wherein the metal member is formed in the main body 600 to reinforce strength. In this case, it is sufficient not to process precisely the metal member and it is easy to process precisely the plastic. Hence, it is easy to process the valve to have desired shape, manufacture cost of the valve may be reduced and the distortion may be minimized when the valve is combined with the pipe.

On the other hand, the flange member of the liner 602, the flange member of the metal member and the flange member of the main body 600 form a flange. In view of the flange, a metal member is included in a plastic. As a result, distortion may be minimized though the flange of the valve is combined with the flange of the pipe.

In the above description, the metal member comprises two sub metal members 610 and 612 disposed symmetrically with the same shape. However, the metal member may be formed with three or more sub metal members. Here, the liner 602 may be disposed in the sub metal members and the sub metal members may be included in the main body 600. The sub metal members may have the same shape or at least one of the sub metal members may have different shape.

For example, three sub metal members, which are separately disposed by 120° and have the same shape, may surround the liner 602.

However, it is efficient that the metal member is formed with two sub metal members 610 and 612, considering the manufacture process.

Figure 7:
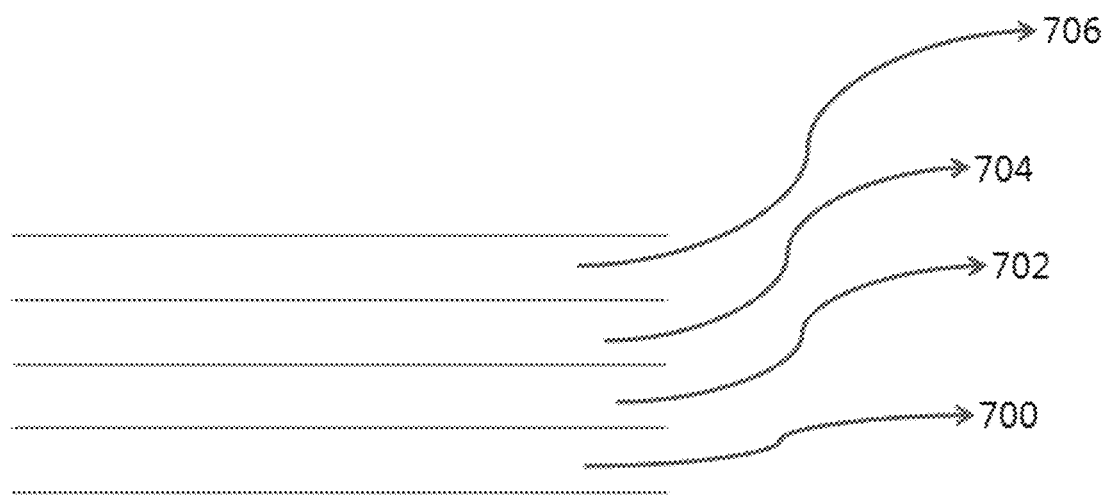
FIG. 7 is a view illustrating schematically a section of a valve according to still an embodiment of the disclosure.

FIG. 7 is a view illustrating schematically a section of a valve according to still another embodiment of the disclosure.

In FIG. 7, a liner 700, a resin layer 702, a metal member 704 including at least two sub metal members and a main body 706 may be sequentially disposed.

That is, unlike other embodiments, in the present embodiment, the resin layer 702 may be disposed between the liner 700 and the metal member 704.

In one embodiment, the resin layer 702 may be formed of the same material as the main body 706. The material of the main body in the above embodiment may be used as the material of the main body 706.

If molding after inserting a structure where the sub metal members surround the liner 700 in a plastic corresponding to the material of the main body 706, melted plastic permeates through a space between the liner 700 and the metal member 704 because a space exists between the sub metal members. As a result, the resin layer 702 may be formed between the liner 700 and the metal member 704.

A hole may be formed at a part of the metal member 704 so that the melted plastic is easily permeated between the liner 700 and the metal member 704.

The structure where the resin layer is formed between the liner and the metal member may be applied to other embodiments.

The embodiments of the disclosure described above are disclosed only for illustrative purposes. A person having ordinary skill in the art would be able to make various modifications, alterations, and additions without departing from the spirit and scope of the disclosure, but it is to be appreciated that such modifications, alterations, and additions are encompassed by the scope of claims set forth below.

The invention claimed is:

1. A valve comprising:
a main body;
an opening-closing member; and
a liner formed in the main body,
wherein a fluid flow space through which fluid flows is formed inside the main body, the opening-closing member opens or closes flow of the fluid,
the fluid flow space has a curved shape from an inlet in a direction from the inlet to the opening-closing member or from an outlet in a direction from the outlet to the opening-closing member,
the fluid flow space is disposed in the liner, and the opening-closing member is disposed at a central part of the fluid flow space,
an inner upper surface and an inner lower surface of the liner corresponding to the fluid flow space have a curved shape, respectively,
a curvature of a curve of the inner upper surface is different from a curvature of an imaginary curve formed at a center of the fluid flow space, and a curvature of a curve of the inner lower surface is different from the curvature of the imaginary curve,
the curve of the inner lower surface includes a first curve formed from the inlet and a second curve near to the opening-closing member,
the first curve has a first radius (R2), the second curve has a second radius (R3), and
a ratio (R2/R3) of the first radius to the second radius is in a range of 145/105 to 110/50.

2. The valve of claim 1, wherein the fluid flow space gets narrower in a direction from the inlet to the opening-closing member and gets narrower in a direction from the outlet to the opening-closing member.

3. The valve of claim 1, wherein the main body is formed by mixing a glass fiber with a Polyvinyl Chloride (PVC), a polypropylene (PP), a Poly Phenylene sulfide (PPS), a Polyphthalamide (PPA), a Polyamide 6 (PA6), a Polyamide 66 (PA66), a Polyketone (POK) or a Polyethylene (PE), and the liner is formed of fluorine resin.

4. The valve of claim 3, wherein the main body is formed by mixing the glass fiber with the PP,
and wherein the PP has a weight percent greater than 60 weight percent, and the glass fiber is a weight percent higher than 0 weight percent and a weight percent less than 40 weight percent.

5. The valve of claim 1, further comprising:
a metal member configured to have at least two sub metal members,
wherein the at least two sub metal members surround the liner, the sub metal members are included in the main body, and the main body is formed of a plastic.

6. The valve of claim 5, wherein the liner includes a liner body member and a liner flange member formed at an end part of the liner body member, at least one of the at least two sub metal members includes a sub body member and a sub flange member formed at an end part of the sub body member, the main body includes a main body member and a main body flange member formed at an end part of the main body member,
and wherein a width of the sub flange member is larger than that of the liner flange member.

7. The valve of claim 6, wherein each of the liner, the at least two sub metal members and the main body is in a body, the sub metal members surround whole of the liner body member, the sub flange member has a shape of doughnuts cut in half, and an end section of the sub flange member contacts with an end section of an other sub flange member.

8. A valve comprising:
a main body;
an opening-closing member; and
a liner formed in the main body,
wherein a fluid flow space through which fluid flows is formed inside the main body, the opening-closing member opens or closes flow of the fluid,
the fluid flow space has a curved shape from an inlet in a direction from the inlet to the opening-closing member or from an outlet in a direction from the outlet to the opening-closing member,
the fluid flow space is disposed in the liner, and the opening-closing member is disposed at a central part of the fluid flow space,
an inner upper surface and an inner lower surface of the liner corresponding to the fluid flow space have a curved shape, respectively,
a curvature of a curve of the inner upper surface is different from a curvature of an imaginary curve formed at a center of the fluid flow space, and a curvature of a curve of the inner lower surface is different from the curvature of the imaginary curve,
the curve of the inner lower surface includes a first curve formed from the inlet and a second curve near to the opening-closing member,
the first curve has a first radius (R2), the second curve has a second radius (R3), and
a first ratio (R2/L) of the first radius (R2) to a distance between the inlet and the outlet is in a first range of 95/160 to 150/165, and a second ratio (R3/L) of the second radius (R3) to the distance (L) is in a second range of 50/160 to 105/197.

9. A valve comprising:
a main body;
an opening-closing member; and
a liner formed in the main body,
wherein a fluid flow space through which fluid flows is formed inside the main body, the opening-closing member opens or closes flow of the fluid,
the fluid flow space has a curved shape from an inlet in a direction from the inlet to the opening-closing member or from an outlet in a direction from the outlet to the opening-closing member,
the fluid flow space is disposed in the liner, and the opening-closing member is disposed at a central part of the fluid flow space,
an inner upper surface and an inner lower surface of the liner corresponding to the fluid flow space have a curved shape, respectively,
a curvature of a curve of the inner upper surface is different from a curvature of an imaginary curve formed at a center of the fluid flow space, and a curvature of a curve of the inner lower surface is different from the curvature of the imaginary curve, and
a ratio (R1/L) of a radius (R1) of the curve of the inner upper surface to a distance (L) between the inlet and the outlet is more than 170/480.

10. A valve comprising:
a main body;
an opening-closing member; and
a liner formed in the main body,
wherein a fluid flow space through which fluid flows is formed inside the main body, the opening-closing member opens or closes flow of the fluid,
the fluid flow space has a curved shape from an inlet in a direction from the inlet to the opening-closing member or from an outlet in a direction from the outlet to the opening-closing member,
the fluid flow space is disposed in the liner, and the opening-closing member is disposed at a central part of the fluid flow space,
an inner upper surface and an inner lower surface of the liner corresponding to the fluid flow space have a curved shape, respectively,
a curvature of a curve of the inner upper surface is different from a curvature of an imaginary curve formed at a center of the fluid flow space, and a curvature of a curve of the inner lower surface is different from the curvature of the imaginary curve,
the curve of the inner lower surface includes a first curve formed from the inlet and a second curve near to the opening-closing member,
the first curve has a first radius (R2), the second curve has a second radius (R3),
a first ratio (R1/R2) of a radius R1 of the curve of the inner upper surface to the first radius R2 is in a first range between 95/165 and 85/95, and a second ratio (R1/R3)

of the radius (R1) to the second radius (R3) is in a second range between 95/105 and 85/50.

11. A valve comprising:
a main body; and
an opening-closing member,
wherein a fluid flow space through which fluid flow is formed inside the main body, the opening-closing member opens/closes flow of the fluid,
an inner upper surface of the valve corresponding to the fluid flow space has a curved shape from an inlet in a direction from the inlet to the opening-closing member, and
a ratio (R1/L) of a radius (R1) of a curve of the inner upper surface to a distance (L) between the inlet and an outlet is more than 170/480.

12. The valve of claim 11, further comprising:
a liner formed in the main body,
wherein the fluid flow space is formed inside the liner, the inner upper surface is an inner upper surface of the liner, the inner upper surface of the liner corresponding to the fluid flow space has a curved shape from the inlet in a direction from the inlet to the opening-closing member,
a ratio (R1/L) of a radius (R1) of a curve of the inner upper surface and the distance (L) is in a range of 170/480 to 110/165, and the fluid flow space gets narrower in a direction from the inlet to the opening-closing member and gets narrower in a direction from the outlet to the opening-closing member.

* * * * *